United States Patent
Tew

(10) Patent No.: US 6,816,640 B2
(45) Date of Patent: Nov. 9, 2004

(54) OPTICAL ADD DROP MULTIPLEXER

(75) Inventor: Claude E. Tew, Dallas, TX (US)

(73) Assignee: Texas Instruments Incorporated, Dallas, TX (US)

(*) Notice: Subject to any disclaimer, the term of this patent is extended or adjusted under 35 U.S.C. 154(b) by 53 days.

(21) Appl. No.: 09/966,990

(22) Filed: Sep. 28, 2001

(65) Prior Publication Data

US 2002/0044722 A1 Apr. 18, 2002

Related U.S. Application Data

(60) Provisional application No. 60/236,532, filed on Sep. 29, 2000, provisional application No. 60/236,533, filed on Sep. 29, 2000, and provisional application No. 60/236,677, filed on Sep. 29, 2000.

(51) Int. Cl.$^7$ .............................. G02B 6/35; G02B 6/28
(52) U.S. Cl. .............................. 385/18; 385/24; 385/36; 385/37
(58) Field of Search ........................... 385/16–21, 36, 385/37, 24

(56) References Cited

U.S. PATENT DOCUMENTS

| | | | |
|---|---|---|---|
| 5,061,049 A | | 10/1991 | Hornbeck |
| 5,583,688 A | | 12/1996 | Hornbeck |
| 6,097,859 A | * | 8/2000 | Solgaard et al. .............. 385/17 |
| 6,330,102 B1 | * | 12/2001 | Daneman et al. ........... 359/290 |
| 6,347,167 B1 | * | 2/2002 | Hagelin ........................ 385/18 |
| 6,466,711 B1 | * | 10/2002 | Laor et al. ..................... 385/18 |
| 6,618,520 B2 | * | 9/2003 | Tew .............................. 385/18 |

FOREIGN PATENT DOCUMENTS

| | | |
|---|---|---|
| DE | 196 44 918 A1 | 4/1998 |
| EP | 0 936 483 A2 | 8/1999 |
| EP | 1 099 966 A2 | 5/2001 |
| GB | 2 286 901 A | 8/1995 |
| WO | WO 00/52864 | 9/2000 |

OTHER PUBLICATIONS

U.S. patent application Ser. No. 09/923,911, Lee et al., filed Aug. 07, 2001.
U.S. patent application Ser. No. 60/236,533, Tew, filed Sep. 29, 2000.
U.S. patent application Ser. No. 60/236,677, Tew, filed Sep. 29, 2000.

* cited by examiner

*Primary Examiner*—Hemang Sangnam
*Assistant Examiner*—Omar Rojas
(74) *Attorney, Agent, or Firm*—Charles A. Brill; Wade James Brady, III; Frederick J. Telecky, Jr.

(57) ABSTRACT

An optical switch ideally suited for use as an optical add drop multiplexer (OADM). A light beam entering the OADM through a first input fiber (402) is separated by wavelength to yield multiple light beams (902, 904). One light beam (902) is reflected by one or more of the mirrors in mirror array (908). Depending on the position of the mirrors struck by light beam (902), the beam is reflected to a first region of a retro-reflector (910) or a second region (912). When light beam (902) is reflected by the second region (912) of the retro-reflector, it again travels to the mirror array (908) and is then reflected to a wavelength combiner (914) and output on the second ("drop") output fiber (408). While a first wavelength light beam (902) is reflected to the drop output (408), other wavelengths of light from the first input (402), for example light beam (904), are directed to the "out" optical fiber (406). A first group of mirrors (914) in the array (908) are thus used selectively to switch various wavelengths of the input optical signal to either the "out" optical fiber (406) or the "drop" optical fiber (408). Another group of mirrors (914) works cooperatively with the first group to direct light beams destined for the "drop" output fiber (408) to the wavelength combiner associated with the "drop" output. Other groups of mirrors operate to switch various wavelengths from the second input (404), the "add" fiber, to the first output "out."

90 Claims, 7 Drawing Sheets

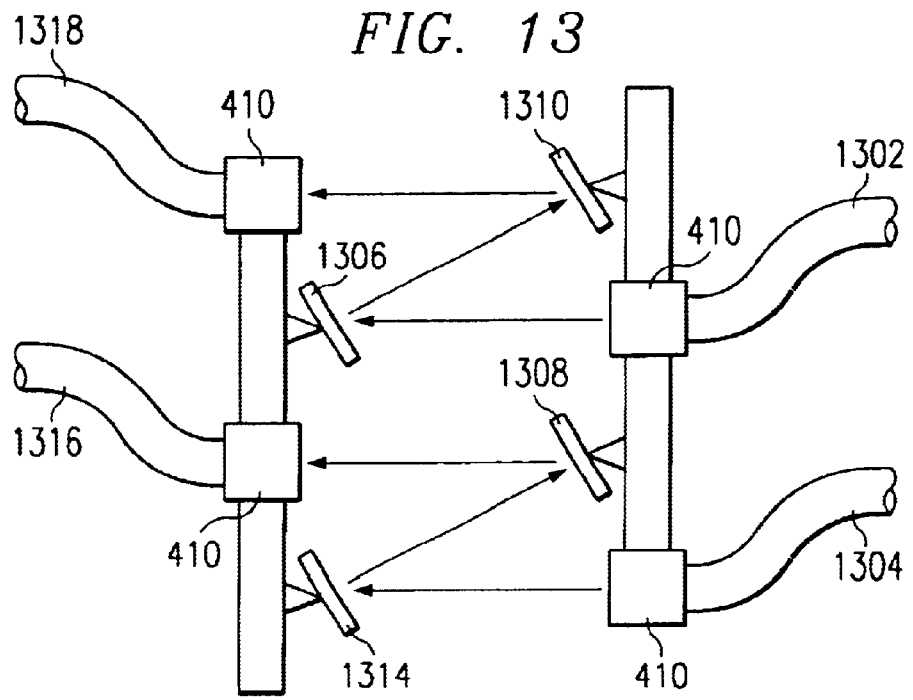
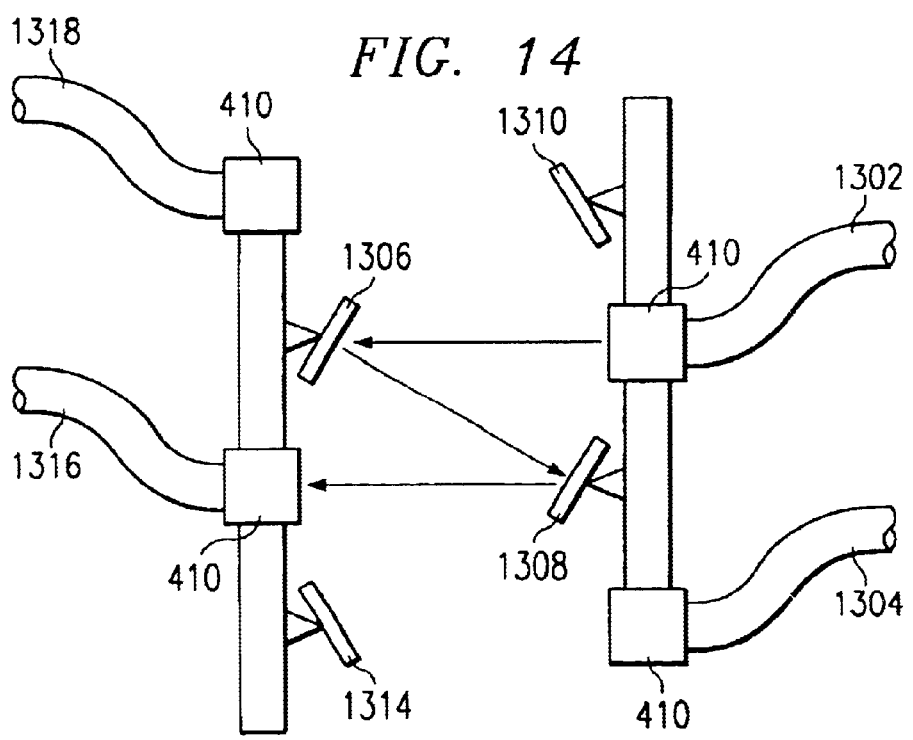

OPTICAL ADD DROP MULTIPLEXER

CROSS-REFERENCE TO RELATED APPLICATIONS

This application claims priority under 35 USC §119 (e)(1) of provisional application No. 60/236,532 filed Sep. 29, 2000, provisional application No. 60/236,533 filed Sep. 29, 2000, and provisional application No. 60/236,677 filed Sep. 29, 2000.

| U.S. Patent No. | Filing Date | Issue Date | Title |
| --- | --- | --- | --- |
| 5,061,049 | Sept. 13, 1990 | Oct. 29, 1991 | Spatial Light Modulator and Method |
| 5,583,688 | Dec. 21, 1993 | Dec. 10, 1996 | Multi-Level Digital Micromirror Device |
| 60/223,366 | Aug. 7, 2000 | | Two Dimensional Blazed Grating |
| 09/966,183 | Herewith | | Micromirror Optical Switch |
| 09/966,399 | Herewith | | Micromirror Optical Switch |

FIELD OF THE INVENTION

This invention relates to the field of optical communication systems, more particularly to fiber-optic communications, especially distributed optical communication systems using dense wavelength division multiplexing.

BACKGROUND OF THE INVENTION

Optical networks use modulated light to enable clear, rapid communication between two points. The bandwidth and efficiency provided by optical communication systems is well known. A single fiber is able to carry a great deal of information over a tremendous distance. Practical communication systems utilize large numbers of fibers networked together to form a communication web that provides at least one path between any two points on the network. Configuring the network to connect any two points requires a large number of switches.

One method of coupling optical fibers converts the optical signal carried by the input fiber to electrical signals and uses the electrical signal modulate another light beam that is transmitted along the second fiber. This method is much slower than simply switching the optical beam and may introduce noise into the transmitted optical signal. Purely optical switching, in which the optical beam from a first fiber is coupled directly to a second fiber without significant loss, is much faster and more efficient and is therefore desired.

Several types of optical switches have been developed. Some use mechanical means to physically align the input and output fibers. These mechanical switches typically are slow, large, and very expensive. What is needed is an improved optical switch that is very quick to configure and does not require the light beam to be converted to electricity.

SUMMARY OF THE INVENTION

Objects and advantages will be obvious, and will in part appear hereinafter and will be accomplished by the present invention which provides a method and system for an all-optical add drop multiplexer. One embodiment of the claimed invention provides an optical switch ideally configured for use as an optical add drop multiplexer. The optical comprises: a first input operable to provide a first input optical signal, a second input operable to provide a second input optical signal, a first output, operable to transmit either of the first and second signals, a second output operable to transmit the first signal; a retro-reflector, and a first, second, third, and fourth deflector. The first deflector is operable in a first state to direct the first input optical signal from the first input to a first point on the retro-reflector. The first deflector is operable in a second state to direct the first input optical signal to a second point on the retro-reflector. The second deflector is operable to direct the first input optical signal from the second point of the retro-reflector to the second output. The third deflector is operable to direct the second input optical signal from the second input to a third point on the retro-reflector. The fourth deflector is operable in a first state to direct the first optical input signal from the first point on the retro-reflector to the first output. The fourth deflector is operable in a second state to direct the second input optical signal from the third point on the retro-reflector to the first output.

A second embodiment of the present invention provides an optical switch ideally suited for use as an optical add drop multiplexer. The optical switch comprises: a first input operable to provide a first input optical signal, a second input operable to provide a second input optical signal; a first output, operable to transmit either of the first and second signals, a second output operable to transmit the first signal, a retro-reflector, a signal separator operable to receive the first input optical signal and to separate the first input optical signal into at least two first input signal components, and a first, second, third, and fourth deflector. The first deflector is operable in a first state to direct at least one the first input signal component from the first input to a first region of the retro-reflector. The first deflector is operable in a second state to direct at least one the first input signal component from the first input to a second region of the retro-reflector; The second deflector is operable to direct the at least one the first input signal component from the second region of the retro-reflector to the second output. The third deflector is operable to direct at least one component of the second input optical signal from the second input to a third region of the retro-reflector. The fourth deflector is operable in a first state to direct the at least one the first input signal component from the first region of the retro-reflector to the first output. The fourth deflector is operable in a second state to direct the second input optical signal from the third region of the retro-reflector to the first output.

Yet another embodiment of the present invention provides an optical switch ideally suited for use as an optical add drop multiplexer. The optical switch comprises: a first input operable to provide a first input optical signal, a second input operable to provide a second input optical signal, a first output operable to transmit either of the first and second signals, a second output operable to transmit the first signal, a first deflector, a second deflector, a third deflector, and a fourth deflector. The first deflector is operable in a first state to direct the first input optical signal from the first input to the fourth deflector. The first deflector is operable in a second state to direct the first input optical signal to the second deflector. The second deflector is operable to direct the first input optical signal from the first deflector to the second output. The third deflector is operable to direct the second input optical signal from the second input to the fourth deflector. The fourth deflector is operable in a first state to direct the first optical input signal from the first deflector to the first output. The fourth deflector is operable in a second state to direct the second input optical signal from the third deflector to the first output.

Still another embodiment of the present invention provides yet another optical switch ideally suited for use as an optical add drop multiplexer. The optical switch comprises: a first input operable to provide a first input optical signal, a second input operable to provide a second input optical signal, first output, operable to transmit either of the first and second signals, a second output operable to transmit the first signal, a signal separator operable to receive the first input optical signal and to separate the first input optical signal into at least two first input signal components, and a first, second, third, and fourth deflector. The first deflector is operable in a first state to direct at least one the first input signal component from the first input to the second deflector. The first deflector is operable in a second state to direct at least one the first input signal component from the first input to the fourth deflector. The second deflector is operable to direct the at least one the first input signal component from first deflector to the second output. The third deflector is operable to direct at least one component of the second input optical signal from the second input to the fourth deflector. The fourth deflector is operable in a first state to direct the at least one the first input signal component from the first deflector to the first output. The fourth deflector is operable in a second state to direct the second input optical signal from the third deflector to the first output.

The disclosed optical switch provides a low-cost, reliable, and optically efficient switch that does not require input signals to be converted from the optical domain to the electrical domain. Thus, the optical signals input to the switch are available as switch outputs without unnecessary signal delay or corruption.

BRIEF DESCRIPTION OF THE DRAWINGS

For a more complete understanding of the present invention, and the advantages thereof, reference is now made to the following descriptions taken in conjunction with the accompanying drawings, in which:

FIG. 13 is a schematic view of an optical add drop multiplexer having an alternate layout that does not require retro-reflectors FIG. 14 is a schematic view of the optical add drop multiplexer of FIG. 13 showing the pass-through orientation of the mirrors.

DETAILED DESCRIPTION OF THE PREFERRED EMBODIMENTS

A new optical switch architecture has been developed that allows signals selectively to be dropped from and added to an optical signal path without converting the signal stream from optical to electrical signals. The new architecture uses micromirrors to switch signals between input and output signal streams efficiently.

Figure 1:
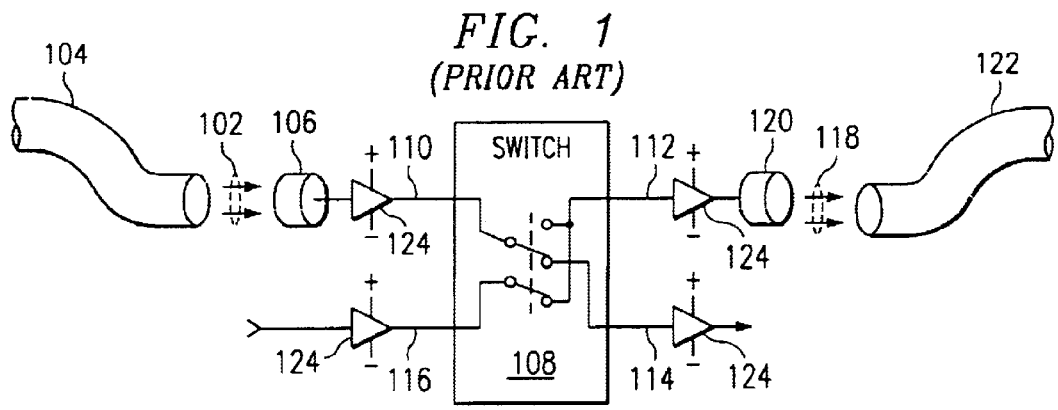
FIG. 1 is a schematic diagram showing the optical-electrical-optical transformations utilized in optical switching applications typical of the prior art.

FIG. 1 is a schematic diagram showing the optical-electrical-optical transformations utilized in optical switching applications typical of the prior art. Prior art switches received an optical signal 102 from a first transmission path, typically an optical fiber 104. A receptor 106 converted the optical signal 102 from modulated light to an electrical signal. An electrical switch 108 connects a first input signal 110 to either a first output signal 112 or a second output signal 114. At the same time, a second input signal 116 is switched to the other output signal.

Signals exiting the switch 108 on the first output 112 are converted to light by laser 120 prior to being transmitted great distances along an output fiber. Signals exiting the switch 108 on the second output 114 are processed locally in electrical form. When the switch is in a first position, the signal on the first input 110 is passed through to the first output 112 and retransmitted. No signal is typically presented to the second input of the switch when it is in the first position. In a second position, the optical signal received on the first input 110 is switched to the second output 114 and processed locally while the signal provided to the second input 116 is converted to optical form and transmitted along the output fiber 122.

Unfortunately, the switch of FIG. 1 must convert the incoming light signal 102 to electrical form whether or not the signal is to be used locally. That is, when it is desired to transmit the incoming light signal 102 along the output fiber 122, the incoming light signal is first converted to an electrical signal 110, switched, and then reconverted to an optical signal 118 and provided to the output fiber 122. This double conversion is unnecessary and slows the transmission of the signal. Furthermore, the receptor 106, the switch 108, and the laser 120, as well as any other circuitry such as amplifiers 124, have the potential to add noise to the signal.

Figure 2:
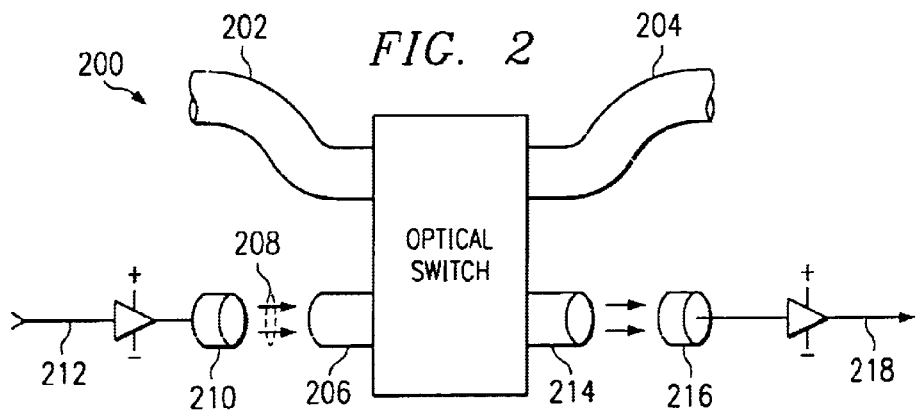
FIG. 2 is a schematic diagram showing the all optical switching methods of the present invention.

The optical switch of FIG. 2 avoids these problems by switching the incoming optical signal without first converting the optical signal to an electrical signal. FIG. 2 is a schematic diagram showing the all optical switching methods of the present invention. In FIG. 2, optical fiber 202 provides an optical input signal and fiber 204 transmits the optical output signal. A second optical input 206 allows an optical signal 208 from laser 210 to be provided to the output fiber 204. The laser 210 is modulated by an electrical signal 212. A second output 214 provides an optical signal to a receptor 216 that translates the optical signal to an electrical signal 218 output by the switch 200.

The switch of FIG. 2 is typically called an optical add drop multiplexer (OADM). It is used in optical networks to pass a received signal along the network, add a new signal to the transmission stream, or drop a signal from the transmission stream. Each fiber in the network typically carries several signals. Using wavelength division multiplexing (WDM) or dense wavelength division multiplexing (DWDM), each signal is assigned a separate wavelength. Each signal in the fiber may have a different destination. The signals are separated by wavelength and signals arriving at their destination are "dropped" using the second output 214. Signals that have yet to reach their intended destination are passed through the first output 204 and continue along the fiber to another node of the network. Signals originating at the current node to be transmitted to another node are input to the switch via the second input 206 and added by the switch to any other signals transmitted along the first output 204. Although the invention will be described in terms of the OADM, it should be understood that other uses of the switch are envisioned.

The new OADM requires a component capable of selectively directing an incoming optical signal along one of at least two paths. A micromirror device is preferred. The micromirror used in the OADM operates using electromagnetic, electrostatic, piezoelectric, or other force. The micromirror is an array of mirrors fabricated on a common substrate, or an array of mirrors separately fabricated and assembled into the OADM. The mirrors are silicon, gold, aluminum, or other metals or materials capable of reflecting the signal energy in the wavelengths transmitted by the switch. If the mirrors are sufficiently large, a single mirror is used to reflect each signal. Alternatively, a number of small mirrors are used to collectively reflect the each signal.

One micromirror that is suitable for use in the OADM is an electrostatic aluminum micromirror capable of rotating in either direction about a torsion axis. One example of such a micromirror is the Digital Micromirror Device™, or DMD™, manufactured by Texas Instruments Incorporated. The DMD is a large array of very small mirrors, each typically 12 to 16 $\mu$M across. DMDs typically are operated in a bistable digital mode in which each mirror is selectively rotated in either a clockwise or counterclockwise direction.

Figure 3:
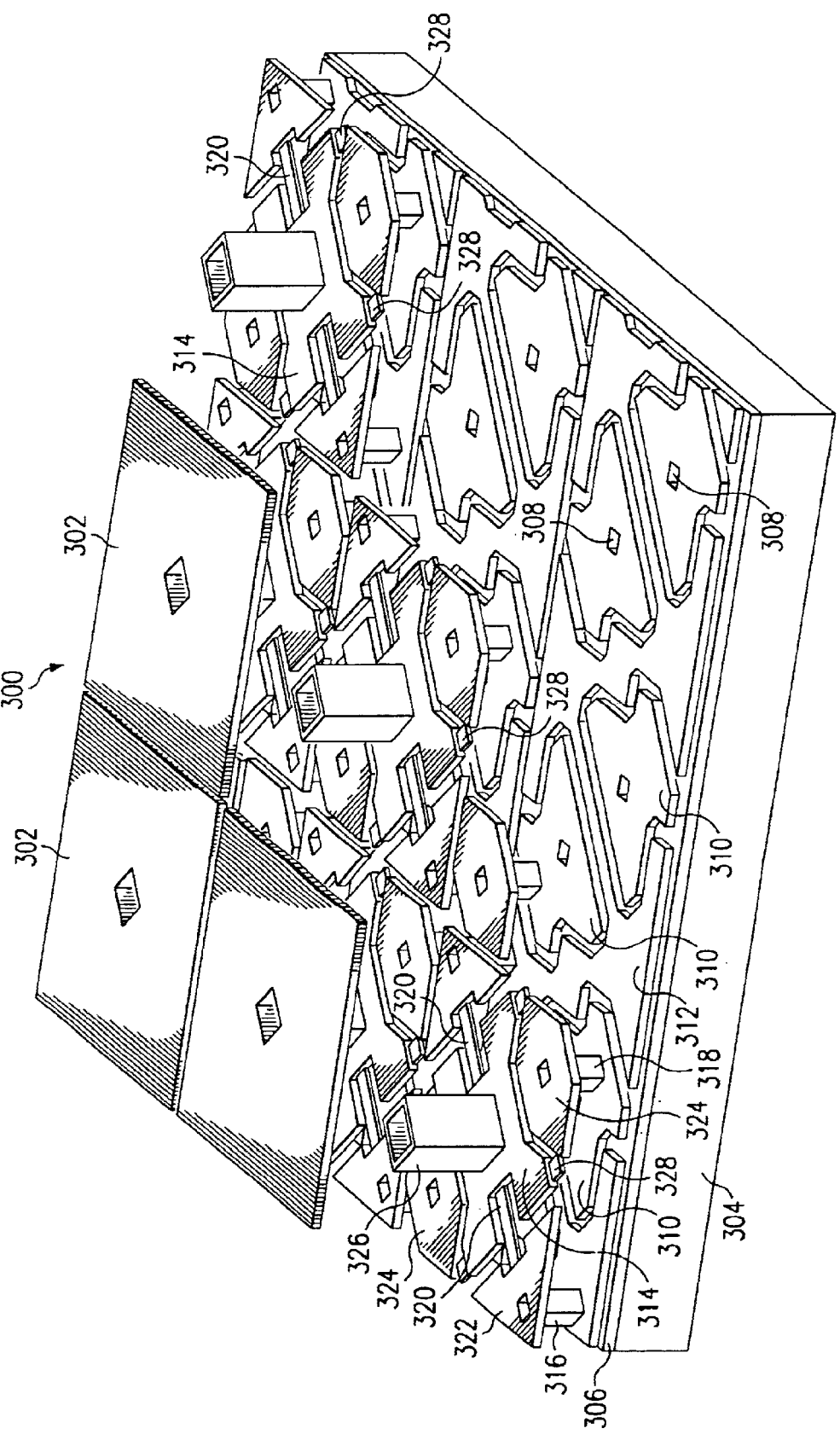
FIG. 3 is a perspective view of a portion of a typical micromirror device used in the optical switch of the present invention.

FIG. 3 is a perspective view of a portion of a typical micromirror device used in the optical switch of the present invention. The micromirror shown in FIG. 3 is a hidden-hinge type, so called because the mirror 302 is elevated over the torsion hinges 320 such that the hinges 120 and remainder of the superstructure are shielded, or hidden, from the incident light. The micromirror 300 is an orthogonal array of micromirror cells, or elements, that often includes more than a thousand rows and columns of micromirrors. FIG. 3 shows a small portion of a micromirror array of the prior art with several mirrors 302 removed to show the underlying mechanical structure of the micromirror array.

The micromirror 300 is fabricated on a semiconductor, typically silicon, substrate 304.

Electrical control circuitry typically is fabricated in or on the surface of the semiconductor substrate 304 using standard integrated circuit process flows. This circuitry typically includes, but is not limited to, a memory cell associated with, and typically underlying, each mirror 302 and digital logic circuits to control the transfer of the digital image data to the underlying memory cells. Voltage driver circuits to drive bias and reset signals to the mirror superstructure may also be fabricated on the micromirror substrate, or may be external to the micromirror. Image processing and formatting logic is also formed in the substrate 304 of some designs. For the purposes of this disclosure, addressing circuitry is considered to include any circuitry, including direct voltage connections and shared memory cells, used to control the direction of rotation of a micromirror mirror.

The silicon substrate 304 and any necessary metal interconnection layers are isolated from the micromirror superstructure by an insulating layer 306 which is typically a deposited silicon dioxide layer on which the micromirror superstructure is formed. Holes, or vias, are opened in the oxide layer to allow electrical connection of the micromirror superstructure with the electronic circuitry formed in the substrate 304.

The first layer of the superstructure is a metalization layer, typically the third metalization layer and therefore often called M3. The first two metalization layers are typically required to interconnect the circuitry fabricated on the substrate. The third metalization layer is deposited on the insulating layer and patterned to form address electrodes 310 and a mirror bias connection 312. Some micromirror designs have landing electrodes which are separate and distinct structures but are electrically connects to the mirror bias connection 312. Landing electrodes limit the rotation of the mirror 302 and prevent the rotated mirror 302 or hinge yoke 314 from touching the address electrodes 310, which have a voltage potential relative to the mirror 302. If the mirror 302 contacts the address electrodes 310, the resulting short circuit could fuse the torsion hinges 316 or weld the mirror 302 to the address electrodes 310, in either case ruining the micromirror.

Since the same voltage is always applied both to the landing electrodes and the mirrors 302, the mirror bias connection and the landing electrodes are preferably combined in a single structure when possible. The landing electrodes are combined with the mirror bias connection 312 by including regions on the mirror bias/reset connection 312, called landing sites, which mechanically limit the rotation of the mirror 302 by contacting either the mirror 302 or the torsion hinge yoke 314. These landing sites are often coated with a material chosen to reduce the tendency of the mirror 302 and torsion hinge yoke 314 to stick to the landing site.

Mirror bias/reset voltages travel to each mirror 302 through a combination of paths using both the mirror bias/reset metalization 312 and the mirrors and torsion beams of adjacent mirror elements. Split reset designs require the array of mirrors to be subdivided into multiple subarrays each having an independent mirror bias connection. The landing electrode/mirror bias 312 configuration shown in FIG. 3 is ideally suited to split reset applications since the micromirror elements are easily segregated into electrically isolated rows or columns simply by isolating the mirror bias/reset layer between the subarrays. The mirror bias/reset layer of FIG. 3 is shown divided into rows of isolated elements.

A first layer of supports, typically called spacervias, is fabricated on the metal layer forming the address electrodes 310 and mirror bias connections 312. These spacervias, which include both hinge support spacervias 316 and upper address electrode spacervias 318, are typically formed by spinning a thin spacer layer over the address electrodes 310 and mirror bias connections 312. This thin spacer layer is typically a 1 $\mu$m thick layer of positive photoresist. The thickness of this thin spacer layer and the dimensions of the landing yoke 314 and spring tips 328 determine the angle through which the finished mirrors will rotate. After the photoresist layer is deposited, it is exposed, patterned, and deep UV hardened to form holes in which the spacervias will be formed. This spacer layer and a thicker spacer layer used later in the fabrication process are often called sacrificial layers since they are used only as forms during the fabrication process and are removed from the device prior to device operation.

A thin layer of metal is sputtered onto the spacer layer and into the holes. An oxide is then deposited over the thin metal layer and patterned to form an etch mask over the regions that later will form hinges 320. A thicker layer of metal, typically an aluminum alloy, is sputtered over the thin layer and oxide etch masks. Another layer of oxide is deposited and patterned to define the hinge yoke 314, hinge cap 322, and the upper address electrodes 324. After this second oxide layer is patterned, the two metals layers are etched simultaneously and the oxide etch stops removed to leave thick rigid hinge yokes 314, hinge caps 322, and upper address electrodes 324, and thin flexible torsion beams 320.

A thick spacer layer is then deposited over the thick metal layer and patterned to define holes in which mirror support spacervias 326 will be formed. The thick spacer layer is typically a 2 μm thick layer of positive photoresist. A layer of mirror metal, typically an aluminum alloy, is sputtered on the surface of the thick spacer layer and into the holes in the thick spacer layer. This metal layer is then patterned to form the mirrors 302 and both spacer layers are removed using a plasma etch.

Once the two spacer layers have been removed, the mirror is free to rotate about the axis formed by the torsion hinge. Electrostatic attraction between an address electrode 310 and a deflectable rigid member, which in effect form the two plates of an air gap capacitor, is used to rotate the mirror structure. Depending on the design of the micromirror device, the deflectable rigid member is the torsion beam yoke 314, the beam or mirror 302, a beam attached directly to the torsion hinges, or a combination thereof. The upper address electrodes 324 also electrostatically attract the deflectable rigid member.

The force created by the voltage potential is a function of the reciprocal of the distance between the two plates. As the rigid member rotates due to the electrostatic torque, the torsion beam hinges resist deformation with a restoring torque which is an approximately linear function of the angular deflection of the torsion beams. The structure rotates until the restoring torsion beam torque equals the electrostatic torque or until the rotation is mechanically blocked by contact between the rotating structure and a fixed component. As discussed below, most micromirror devices are operated in a digital mode wherein sufficiently large bias voltages are used to ensure full deflection of the micromirror superstructure.

Micromirror devices are generally operated in one of two modes of operation. The first mode of operation is an analog mode, sometimes called beam steering, in which the address electrode is charged to a voltage corresponding to the desired deflection of the mirror. Light striking the micromirror device is reflected by the mirror at an angle determined by the deflection of the mirror.

The second mode of operation is a digital mode. When operated digitally, each micromirror is fully deflected in either of the two directions about the torsion beam axis. Digital operation uses a relatively large voltage to ensure the mirror is fully deflected. Since it is advantageous to drive the address electrode using standard logic voltage levels, a bias voltage, typically a negative voltage, is applied to the mirror metal layer to increase the voltage difference between the address electrodes and the mirrors. Use of a sufficiently large mirror bias voltage—a voltage above what is termed the collapse voltage of the device—ensures the mirror will deflect to the closest landing electrodes even in the absence of an address voltage. Therefore, by using a large mirror bias voltage, the address voltages need only be large enough to deflect the mirror slightly.

Figure 4:
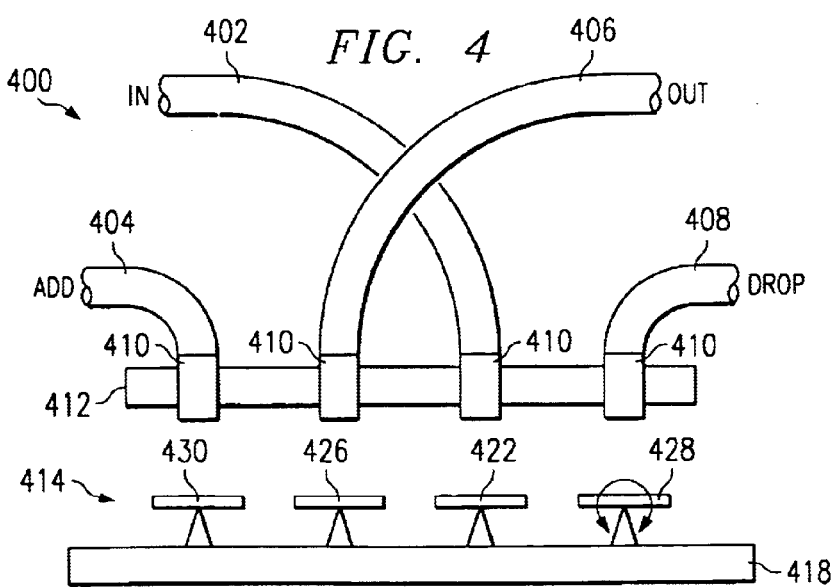
FIG. 4 is a side view of the optical add drop multiplexer of the present invention operable to switch a single optical signal.

FIG. 4 is a side view of the OADM 400 of the present invention. For simplicity, it will be assumed that the input signal to the OADM only consists of a single signal—that is, a single wavelength. Further embodiments designed to switch the multiple signals found in WDM and DWDM networks will be described below.

In FIG. 4, the OADM 400 has two inputs and two outputs. A first input fiber 402 provides an optical signal to the OADM 400. This first input fiber 402, the "in" fiber, typically provides signals from remote portions of an optical network. A second input 404, the "add" fiber, allows a local signal to be transmitted by the network. The two output fibers include a first output 406, typically connected to the rest of the network, and a second output 408, typically used to deliver a signal to local equipment.

Each fiber preferably is coupled to a focusing optic, typically a gradient index lens, designed to control dispersion of the light exiting the fiber. The focusing optic typically is held in a ferrule 410. The ferrule 410 aligns the fiber with the focusing optic and provides a means to attach the fiber to a holding block 412. As will be discussed further, the bottom surface of the holding block 412 typically is reflective.

The micromirror array 414 of FIG. 4 includes four discrete mirrors 422, 426, 428, 430. Each of the mirrors 422, 426, 428, 430 is operable to tilt clockwise or counterclockwise about an axis perpendicular to the plane of FIG. 4. The supporting structure of the mirrors is not shown, but instead each mirror is illustrated as supported on the tip of a triangle to show that each mirror is operable to tilt in either direction. The mirrors of FIG. 4 are all fabricated on a single substrate 418.

Figure 5:
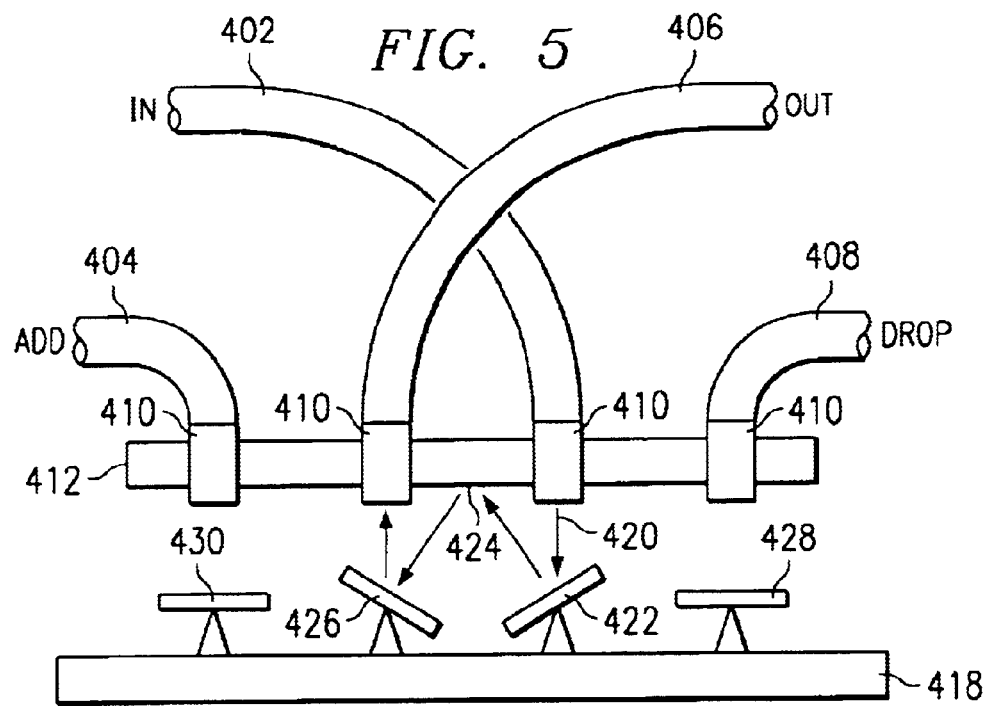
FIG. 5 is a side view of the optical add drop multiplexer of FIG. 4 showing a signal passing through the multiplexer.

FIG. 5 is a side view of the optical add drop multiplexer of FIG. 4 showing a signal passing through the multiplexer. In FIG. 5, light 420 entering the OADM from the first input fiber 402 travels to a first mirror 422. When the mirror is tilted to a first position, counterclockwise in the case illustrated in FIG. 5, the light beam 420 is reflected to a first point or region 424 on the holder block 412. The holder block 412 reflects the light beam 420 to a fourth mirror 426. When the fourth mirror 426 is in a first position, in the case of FIG. 5 rotated clockwise as shown, the light beam 420 reflected by the holder block 412 is directed from the first region 424 of the holder block 412 to the first output fiber 406 from the OADM. Thus, any signal received by the OADM on the first input fiber 402 passes through the OADM and exits the OADM on the first output fiber 406.

Figure 6:
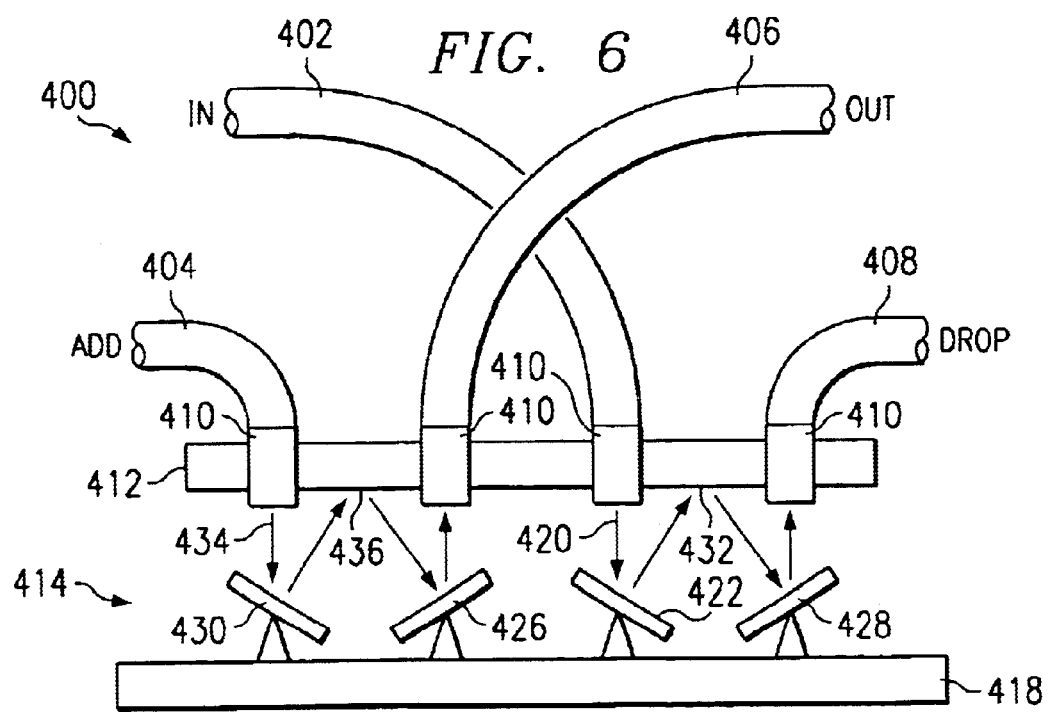
FIG. 6 is a side view of the OADM of FIG. 4 showing a second switch position used to add and drop signals.

FIG. 6 is a side view of the OADM of FIG. 4 showing a second switch position used to add and drop signals. In FIG. 6, the first mirror 422 is rotated clockwise to a second position. In the second position, the first mirror 422 reflects light beam 420 from the first input fiber 402 to a second point or region 432 on the holding block 412. From the second region 432, the light beam 420 travels to a second mirror 428 and is reflected to the second output fiber 408, the "drop" fiber.

At the same time the light beam 420 from the "in" fiber 402 is being dropped, another light beam 434 is proved to the first output fiber 406. The second light beam 434 exits the second input fiber 404, the "add" fiber, and is reflected by a third mirror 430 to a third point or region 436 on the holding block 412. From the third region 436, the light travels to the fourth mirror 426 which, when in a second position shown in FIG. 6 (rotated counterclockwise), directs the second light beam 434 to the first output fiber 406.

Figure 7:
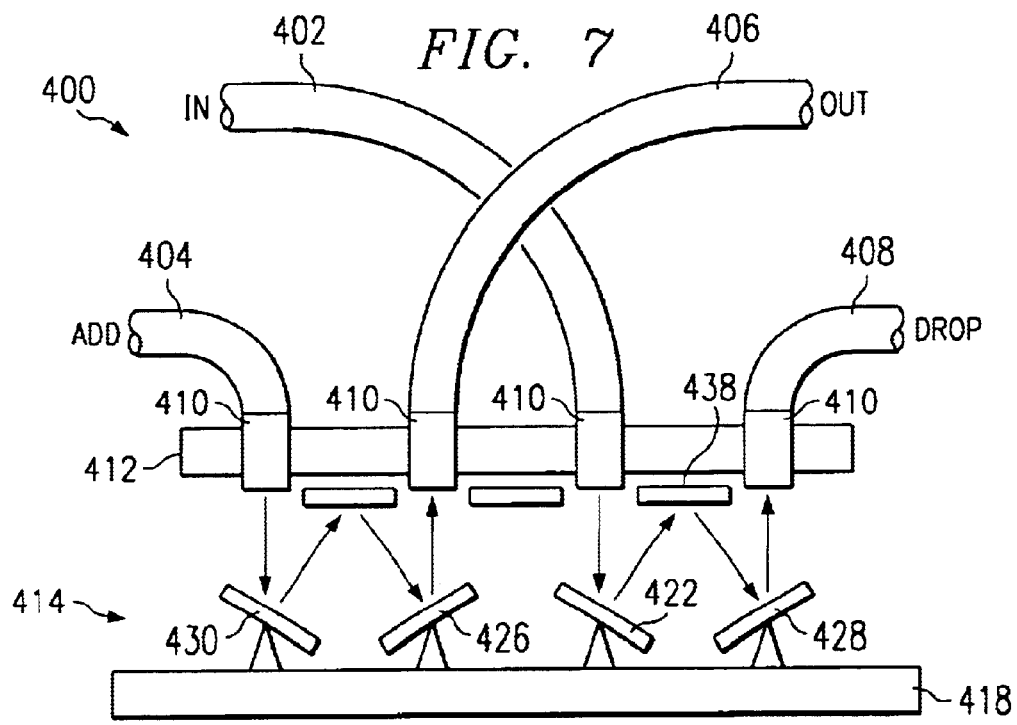
FIG. 7 is a side view of the optical add drop multiplexer of FIG. 4 showing an optional retro-reflector separate from the optical fiber holder.

FIG. 7 is a side view of the OADM of FIG. 4 showing a retro-reflector 438 that is separate from the holder block 412. The retro-reflector 438 is a single reflector, or separate reflectors in each of the regions used to reflect the light signals. The retro-reflector typically is flat, but may be curved, typically concave, to focus the light beam while it is being reflected.

Figure 8:
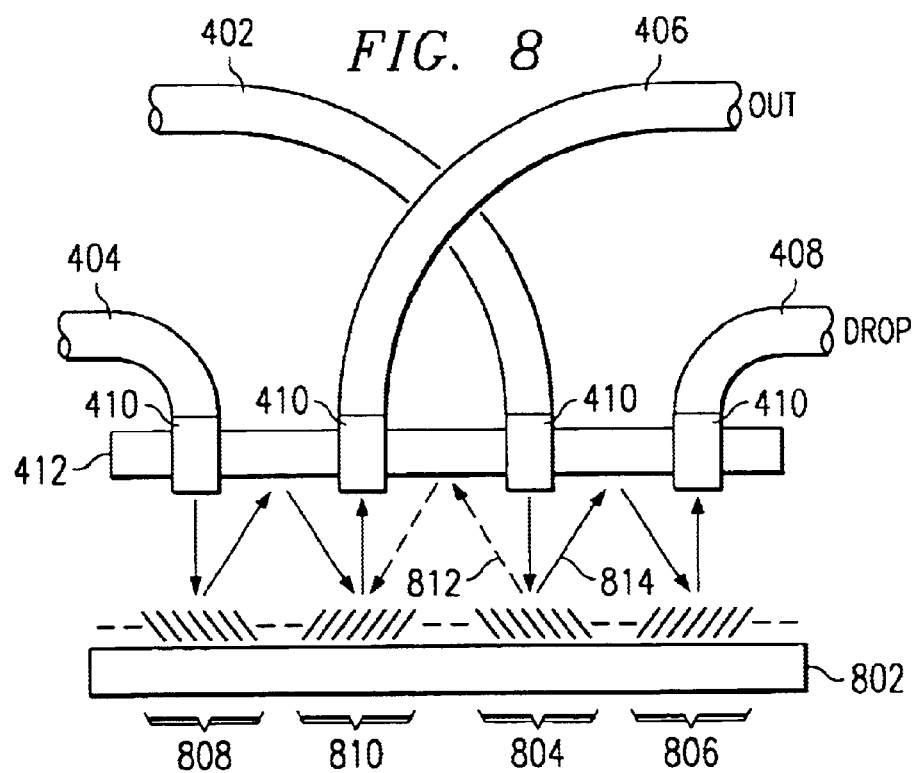
FIG. 8 is a side view of the optical add drop multiplexer of FIG. 4 showing the use of an array of small mirrors in place of each large mirror of FIG. 4.

As mentioned above, small mirrors—mirrors smaller than the diameter of the light beam—are also used for form the OADM. FIG. 8 is a side view of the optical add drop multiplexer of FIG. 4 showing the use of a group of small mirrors in an array in place of each large mirror of FIG. 4. In FIG. 8, light from a first input fiber 402 is deflected by a first deflector, typically a group 804 of micromirrors. When the deflector 804 is in a first position, the input light is directed along a first path 812 to a fourth deflector 810 and then to a first output fiber 406. When the deflector 804 is in a second position, the input light is directed along a second path 814 to a second deflector 806 and from the second deflector 806 to a second output 408. Light from a second input 404 is directed by deflector 808 along a path to the fourth deflector 810 and from there to the first output 406.

When small mirrors, mirrors smaller than the beam cross-section, are used, the mirror rotations angles should be selected to ensure blazed operation of the mirror array. Mirrors in common micromirror devices are 16 $\mu$m on each side and spaced 1 $\mu$m from the surrounding mirrors. As described in U.S. patent application Ser. No. 09/923,911, proper selection of the deflection angle ensures the array operates in an efficient blazed condition. For mirrors on 17 $\mu$m centers, as described above, ideal deflection angles are 7.5° and 11.2°, which blaze the $2^{nd}$ and $3^{rd}$ orders respectively. For mirrors on 13.8 $\mu$m centers, a deflection angle of 9.6° blazes the $2^{nd}$ order.

Although groups of small mirrors are used, to avoid confusion the bulk of this disclosure will refer to single mirrors used for each reflection and collectively refer to all of mirrors in the switch as the mirror array 414. Unless the context dictates otherwise, each reference to a single mirror should be understood to refer to either a single mirror or a group of mirrors.

Figure 9:
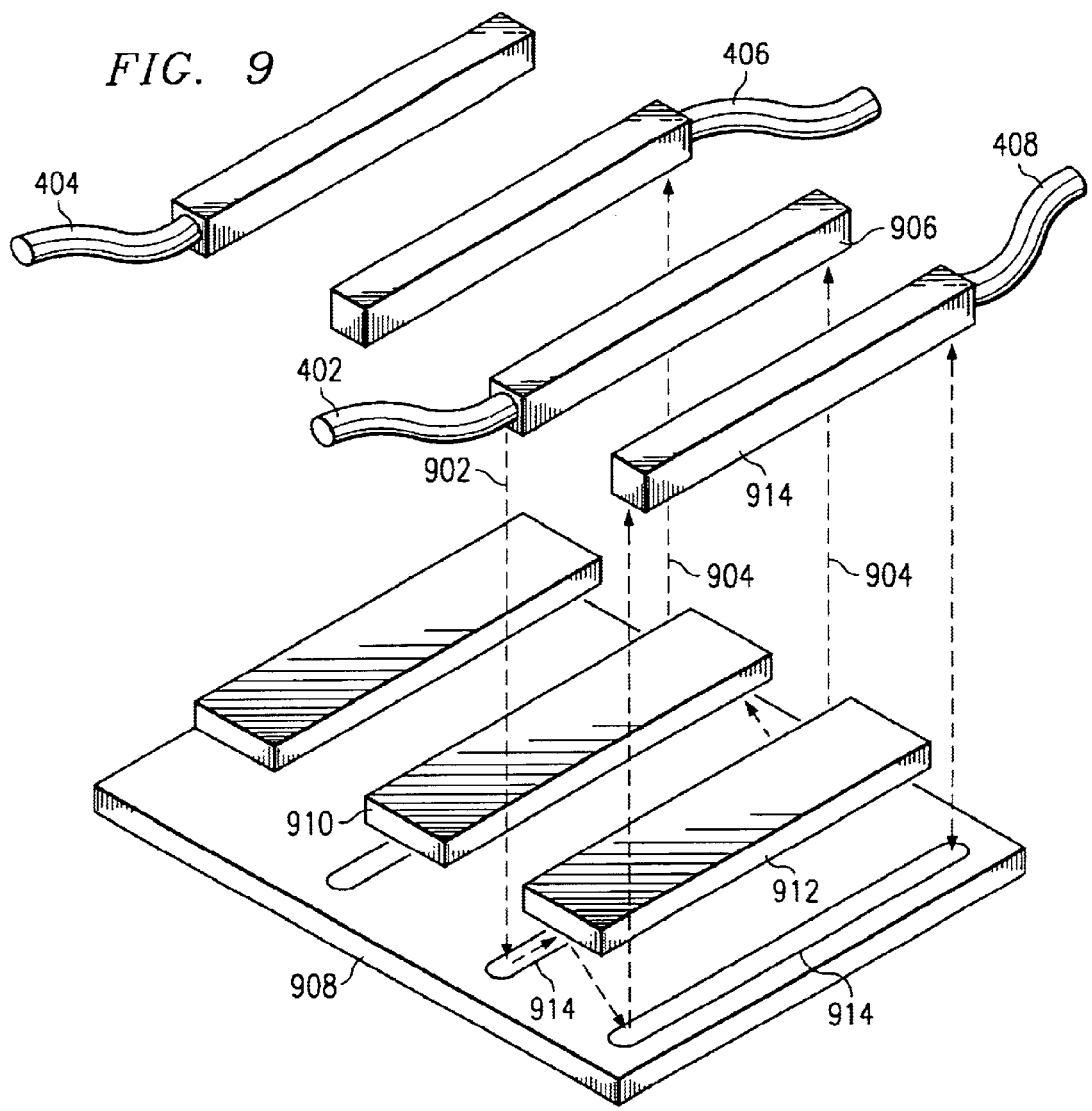
FIG. 9 is a schematic view of a dense wavelength division multiplexing optical add drop multiplexer.

The primary advantage of the disclosed micromirror-based OADM is achieved when switching various signal components into and out of a WDM or DWDM optical signal. FIG. 9 is a schematic view of a dense wavelength division multiplexing OADM. In FIG. 9, a light beam entering the OADM through a first input fiber 402 is separated by wavelength to yield two light beams 902, 904. The number of separate light beams output by the wavelength separator 906 is not critical, but is determined by the capability of the splitter to separate the wavelengths and by the ability of the remainder of the optical network to generate the various wavelengths.

Light beam 902 is reflected by one or more of the mirrors (not shown) in mirror array 908. Depending on the position of the mirrors struck by light beam 902, light beam 902 is reflected to a first region of a retro-reflector 910 or a second region 912. As in FIG. 7, the retro-reflector is either a single component or separate reflectors are used for each of the regions. As shown, when light beam 902 is reflected by the second region 912 of the retro-reflector, it again travels to the mirror array 908 and is then reflected to a wavelength combiner 914 and output on the second ("drop") output fiber 408.

While a first wavelength light beam 902 is reflected to the drop output 408, other wavelengths of light from the first input 402, for example light beam 904, are directed to the "out" optical fiber 406. Light beams 902 and 904 are illustrated as occupying opposite ends of the spectrum of wavelengths switched by the OADM of FIG. 9. A first group of mirrors 914 in the array 908 are thus used selectively to switch various wavelengths of the input optical signal to either the "out" optical fiber 406 or the "drop" optical fiber 408. Another group of mirrors 914 works cooperatively with the first group to direct light beams destined for the "drop" output fiber 408 to the wavelength combiner associated with the "drop" output. Although not indicated in FIG. 9, other groups of mirrors operate to switch various wavelengths from the second input 404, the "add" fiber, to the first output "out."

FIG. 9 illustrates the operation of a multi-wavelength OADM. FIG. 9 is not intended to picture each and every optical element in the OADM. It is envisioned that various additional components will be used in some applications at the discretion of the optical designer. For example, focusing optics may be added between the input fibers and the wavelength separators, between the wavelength combiners 914 and the output fibers, and between the mirror array 908 and separators 906 or combiners 914. Furthermore, although shown as separate separators 906 and combiners 914, it should be understood that a other configurations are intended by this disclosure. For example, a single diffraction grating or prism could replace all of the separators and combiners.

Figure 10:
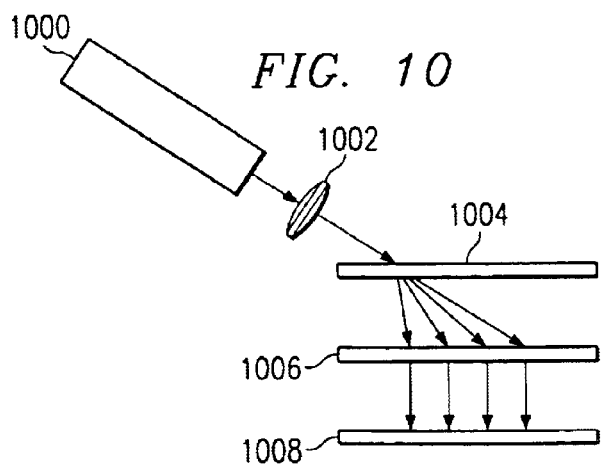
FIG. 10 is a side view of a beam splitting device used in the dense wavelength division multiplexing optical add drop multiplexer of FIG. 9.

FIG. 10 is a side view of a beam splitting device used in the DWDM OADM of FIG. 9. In FIG. 10, light from an input fiber 1000 is collimated by an optic 1002 and strikes a beam separator such as diffraction grating 1004. The diffraction grating spatially separates the component beams of the input light beam. The component beams are directed by a second focusing optic 1006 to the mirror array 1008. As discussed above, the mirror array selectively directs the beams to one of at least two output fibers.

Figure 11:
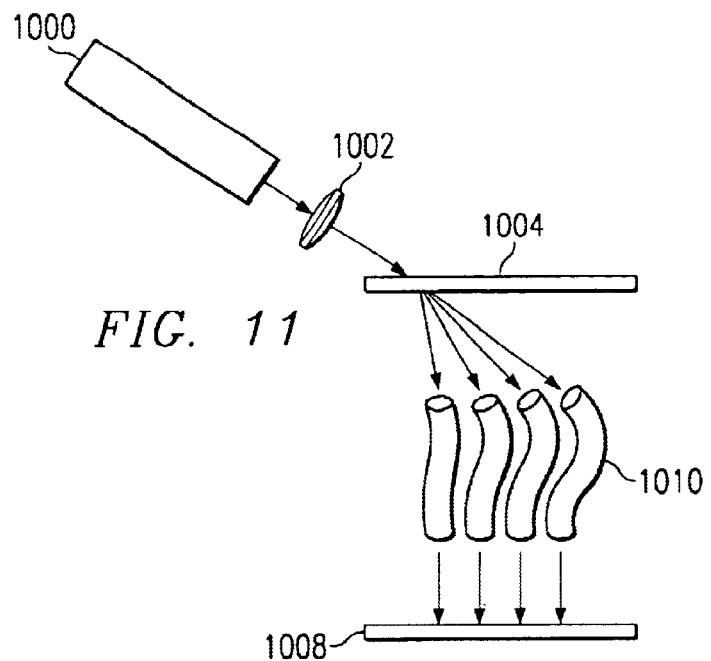
FIG. 11 is a side view of a beam splitting device used in the dense wavelength division multiplexing optical add drop multiplexer of FIG. 9.

FIG. 11 is a side view of a second beam splitting apparatus used in the DWDM OADM of FIG. 9. In FIG. 11, light from the input fiber 1000 again is focused onto a beam separator such as diffraction grating 1004 by a focusing optic 1002. The separated beams are then individually captured by a set of optical fibers 1010. The optical fibers 1010 re-emit the separated light beams to the mirror array 1008. Although both FIGS. 10 and 11 show directing the separated light beams perpendicular to the plane of the mirror array 1008, it should be understood that this orientation is not necessary. Reorienting the light beams as shown, however, simplifies the design in some respects compared to allowing the light beams to continue to diverge from the optical separator.

Figure 12:
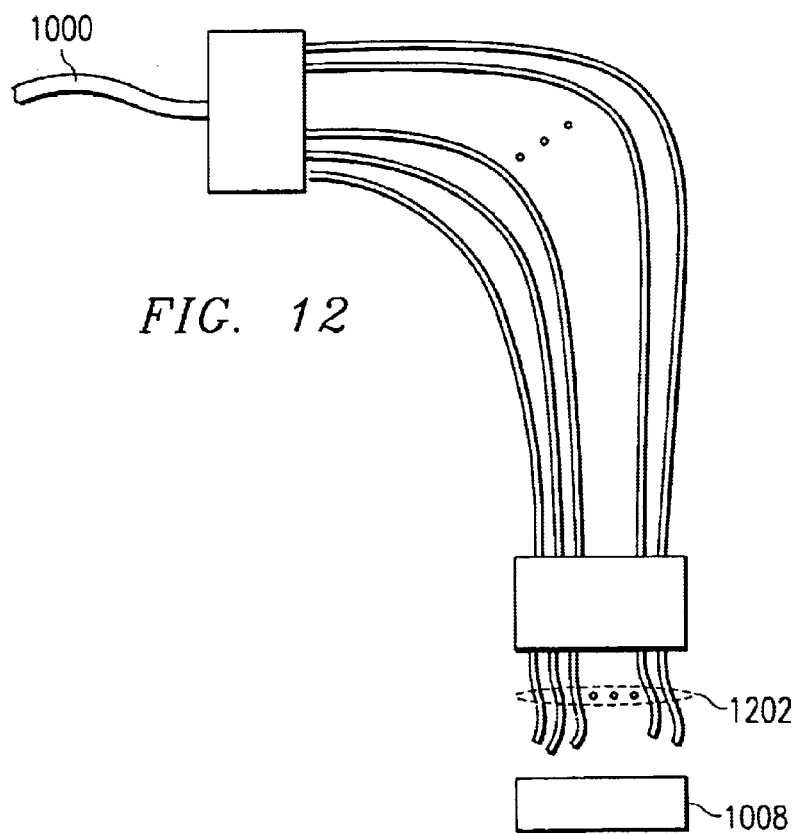
FIG. 12 is a side view of a beam splitting device used in the dense wavelength division multiplexing optical add drop multiplexer of FIG. 9.

FIG. 12 is a side view of another beam splitting device used in the DWDM OADM of FIG. 9. In FIG. 12, light from the input fiber 1000 enters an arrayed waveguide grating. The arrayed waveguide grating router includes a series of arrayed channel waveguides which function as a diffraction grating. The arrayed waveguide grating enables the use of more than forty DWDM channels. Light separated by the arrayed waveguide grating is output on a series of fibers 1202 to the mirror array 1008 of the OADM.

FIG. 13 is a side view of an OADM showing an alternate layout of the device that does not require retro-reflectors. In FIG. 13, optical signals are provided to the OADM by a first input fiber 1302 and a second input fiber 1304, the "add" fiber. The input from the first input fiber 1302 is reflected by a first mirror 1306 to either a third mirror 1308 when the first mirror is in a first position, or to a second mirror 1310 when the first mirror 1306 is in a second position. If FIG. 13 the first mirror is shown in the second position reflecting light to the second mirror 1310. The second mirror reflects the light from the first input fiber 1302 to a second output fiber 1318, the "drop" fiber. Light from a second input fiber 1304, the "add" fiber, is reflected by a third mirror 1314 to a fourth mirror 1308. The fourth mirror directs the light from the second input fiber 1304 to the first output fiber 1316, the "out" fiber.

FIG. 14 shows a schematic view of the OADM of FIG. 13 showing the mirrors in the pass-through orientation. As shown in FIG. 14, when the first mirror 1306 is in a first position, light from the first optical fiber input 1302 is transmitted to the fourth mirror 1308. The fourth mirror is rotated in a first position such that the light from the first optical fiber input 1302 is transmitted to the first output fiber 1316, the "out" fiber. Comparing the alternate layout of the optical switch shown in FIGS. 13 and 14 to the layout of FIGS. 4 through 9, it is seen that the alternate layout of FIGS. 13 and 14 performs a similar function, but uses at least two mirror arrays and no retro-reflectors.

Comparing FIGS. 13 and 14, it is evident that the second 1310 and third 1314 mirrors need not operate. Referring back to FIGS. 5 and 6, it is evident the same is true for the second 428 and third 430 deflecting members of the prior architectures as well. Thus, the deflecting members may be comprised of four moveable members, or arrays of moveable members, or just two moveable members, or arrays of moveable members, in combination with two stationary deflecting members. Furthermore, the stationary deflecting members, like the moveable members, may have curved as well as flat optical surfaces. For example, in some applications using a spherical or aspherical curved deflecting surface helps to focus the light from one fiber or mirror to the next, or helps to simplify alignment of the OADM during assembly.

The OADM of FIGS. 13 and 14 is also used in WDM and DWDM applications in which an input signal is divided into a plurality of input signals based on the wavelengths of the various input signal components. The various input signal components are then switched independently of each other by different mirror arrays or different portions of a shared mirror array. This permits various components to be added or dropped from a transmitted optical signal without converting the signal to the electrical domain.

Thus, although there has been disclosed to this point a particular embodiment for an optical add drop multiplexer and method therefore etc., it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. An optical switch comprising:
   a first input operable to provide a first input optical signal;
   a second input operable to provide a second input optical signal;
   a first output operable to transmit either of said first and second signals;
   a second output operable to transmit said first signal;
   a retro-reflector;
   a first deflector operable to rotate about an axis in opposite directions from a neutral position to a first and second state, said first deflector operable in said first state to direct said first input optical signal from said first input to a first point on said retro-reflector, said first deflector operable in said second state to direct said first input optical signal to a second point on said retro-reflector;
   a second deflector operable to direct said first input optical signal from said second point of said retro-reflector to said second output;
   a third deflector operable to direct said second input optical signal from said second input to a third point on said retro-reflector; and
   a fourth deflector operable to rotate about an axis in opposite directions from a neutral position to a first and second state, said fourth deflector operable in said first state to direct said first optical input signal from said first point on said retro-reflector to said first output, said fourth deflector operable in said second state to direct said second input optical signal from said third point on said retro-reflector to said first output.

2. The optical switch of claim 1, wherein said retro-reflector is comprised of at least two separate retro-reflectors.

3. The optical switch of claim 1, wherein said retro-reflector is comprised of at least three separate retro-reflectors.

4. The optical switch of claim 1, wherein said retro-reflector is a curved reflecting surface.

5. The optical switch of claim 1, wherein said retro-reflector is operable to focus said first signal from said first deflector to said second deflector.

6. The optical switch of claim 1, wherein said retro-reflector is operable to focus said first signal from said first deflector to said fourth deflector.

7. The optical switch of claim 1, wherein said retro-reflector is operable to focus said second signal from said third deflector to said fourth deflector.

8. The optical switch of claim 1, at least one of said first, second, third, and fourth deflectors comprised of a single reflective surface.

9. The optical switch of claim 1, at least one of said first, second, third, and fourth deflectors comprised of an array of reflective surfaces.

10. The optical switch of claim 1, said first, second, third, and fourth deflectors comprised of a single array of reflective surfaces.

11. The optical switch of claim 1, at least one of said second and third deflectors comprised of a fixed reflective surface.

12. The optical switch of claim 1, at least one of said first, second, third, and fourth deflectors comprised of a flat reflective surface.

13. The optical switch of claim 1, at least one of said first, second, third, and fourth deflectors comprised of a curved reflective surface.

14. The optical switch of claim 1, at least one of said first, second, third, and fourth deflectors comprised of a spherical curved reflective surface.

15. The optical switch of claim 1, at least one of said first, second, third, and fourth deflectors comprised of an aspherical curved reflective surface.

16. The optical switch of claim 1, at least one of said first and second inputs comprised of an optical fiber.

17. The optical switch of claim 1, at least one of said first and second outputs comprised of an optical fiber.

18. An optical switch comprising:

a first input operable to provide a first input optical signal;

a second input operable to provide a second input optical signal;

a first output operable to transmit either of said first and second signals;

a second output operable to transmit said first signal;

a retro-reflector;

a signal separator operable to receive said first input optical signal and to separate said first input optical signal into at least two first input signal components;

a first deflector operable to rotate about an axis in opposite directions from a neutral position to a first and second state, said first deflector operable in said first state to direct at least one said first input signal component from said first input to a first region of said ratio-reflector, said first deflector operable in said second state to direct at least one said first input signal component from said first input to a second region of said retro-reflector;

a second deflector operable to direct said at least one said first input signal component from said second region of said retro-reflector to said second output;

a third deflector operable to direct at least one component of said second input optical signal from said second input to a third region of said retro-reflector; and a fourth deflector operable to rotate about an axis in opposite directions from a neutral position to a first and second state, said fourth deflector operable in said first state to direct said at least one said first input signal component from said first region of said retro-reflector to said first output, said fourth deflector operable in said second state to direct said second input optical signal from said third region of said retro-reflector to said first output.

19. The optical switch of claim 18, wherein said retro-reflector is comprised of at least two separate retro-reflectors.

20. The optical switch of claim 18, wherein said retro-reflector is comprised of at least three separate retro-reflectors.

21. The optical switch of claim 18, wherein said ratio-reflector is a curved reflecting surface.

22. The optical switch of claim 18, wherein said retro-reflector is operable to focus said first signal from said first deflector to said second deflector.

23. The optical switch of claim 18, wherein said retro-reflector is operable to focus said first signal from said first deflector to said fourth deflector.

24. The optical switch of claim 18, wherein said retro-reflector is operable to focus said second signal from said third deflector to said fourth deflector.

25. The optical switch of claim 18, at least one of said first, second, third, and fourth deflectors comprised of a single reflective surface.

26. The optical switch of claim 18, at least one of said first, second, third, and fourth deflectors comprised of an array of reflective surfaces.

27. The optical switch of claim 18, said first, second, third, and fourth deflectors comprised of a single array of reflective surfaces.

28. The optical switch of claim 18, at least one of said second and third deflectors comprised of a fixed reflective surface.

29. The optical switch of claim 18, at least one of said first, second, third, and fourth deflectors comprised of a flat reflective surface.

30. The optical switch of claim 18, at least one of said first, second, third, and fourth deflectors comprised of a curved reflective surface.

31. The optical switch of claim 18, at least one of said first, second, third, and fourth deflectors comprised of a spherical curved reflective surface.

32. The optical switch of claim 18, at least one of said first, second, third, and fourth deflectors comprised of an aspherical curved reflective surface.

33. The optical switch of claim 18, at least one of said first, second, third, and fourth deflectors comprised of a linear array of reflective surfaces, said linear array comprised of portions of said array, each said portion selectively operable to deflect one of said input signal components.

34. The optical switch of claim 18, at least one of said first, second, third, and fourth deflectors comprised of an area array of reflective surfaces.

35. The optical switch of claim 18, at least one of said first and second inputs comprised of an optical fiber.

36. The optical switch of claim 18, at least one of said first and second outputs comprised of an optical fiber.

37. The optical switch of claim 18, further comprising at least one optical fiber to direct at least one signal component from said signal separator to said first deflector.

38. The optical switch of claim 18, said signal separator further comprising a grating.

39. The optical switch of claim 18, said signal separator further comprising a prism.

40. The optical switch of claim 18, said signal separator further comprising a hologram.

41. The optical switch of claim 18, said signal separator further comprising an arrayed waveguide grating.

42. An optical switch comprising:

a first input operable to provide a first input optical signal;

a second input operable to provide a second input optical signal;

a first output operable to transmit either of said first and second signals;

a second output operable to transmit said first signal;

a first deflector;

a second deflector;

a third deflector;

a fourth deflector;

said first deflector operable to rotate about an axis in opposite directions from a neutral position to a first and second state, said first deflector operable in said first state to direct said first input optical signal from said first input to said fourth deflector, said first deflector operable in said second state to direct said first input optical signal to said second deflector;

said second deflector operable to direct said first input optical signal from said first deflector to said second output;

said third deflector operable to direct said second input optical signal from said second input to said fourth deflector; and said fourth deflector operable to rotate about an axis in opposite direction from a neutral position to a first and second state, said fourth deflector operable in said first state to direct said first optical input signal from said first deflector to said first output, said fourth deflector operable in said second state to direct said second input optical signal from said third deflector to said first output.

43. The optical switch of claim 42, at least one of said first, second, third, and fourth deflectors comprised of a single reflective surface.

44. The optical switch of claim 42, at least one of said first, second, third, and fourth deflectors comprised of an array of reflective surfaces.

45. The optical switch of claim 42, said first, second, third, and fourth defectors comprised of a single array of reflective surfaces.

46. The optical switch of claim 42, at least one of said second and third defectors comprised of a fixed reflective surface.

47. The optical switch of claim 42, at least one of said first, second, third, and fourth defectors comprised of a flat reflective surface.

48. The optical switch of claim 42, at least one of said first, second, third, and fourth defectors comprised of a curved reflective surface.

49. The optical switch of claim 42, at least one of said first, second, third, and fourth defectors comprised of a spherical curved reflective surface.

50. The optical switch of claim 42, at least one of said first, second, third, and fourth deflectors comprised of an aspherical reflective surface.

51. The optical switch of claim 42, at least one of said first and second inputs comprised of an optical fiber.

52. The optical switch of claim 42, at least one of said first and second outputs comprised of an optical fiber.

53. An optical switch comprising:
 a first input operable to provide a first input optical signal;
 a second input operable to provide a second input optical signal;
 a first output operable to transmit either of said first and second signals;
 a second output operable to transmit said first signal;
 a signal separator operable to receive said first input optical signal and to separate said first input optical signal into at least two first input signal components;
 a first deflector;
 a second deflector;
 a third deflector;
 a fourth deflector;
 said first deflector operable to rotate about an axis in opposite directions from a neutral position to a first and second state, said first deflector operable in said first state to direct at least one said first input signal component from said first input to said second deflector, said first deflector operable in said second state to direct at least one said first input signal component from said first input to said fourth deflector;
 said second deflector operable to direct said at least one said first input signal component from first deflector to said second output;
 said third deflector operable to direct at least one component of said second input optical signal from said second input to said fourth deflector; and
 said fourth deflector operable to rotate about an axis in opposite directions from a neutral position to a first and second state, said fourth deflector operable in said first state to direct said at least one said first input signal component from said first deflector to said first output, said fourth deflector operable in said second state to direct said second input optical signal from said third deflector to said first output.

54. The optical switch of claim 53, at least one of said first, second, third, and fourth deflectors comprised of a single reflective surface.

55. The optical switch of claim 53, at least one of said first, second, third, and fourth deflectors comprised of an array of reflective surfaces.

56. The optical switch of claim 53, said first, second, third, and fourth deflectors comprised of a single array of reflective surfaces.

57. The optical switch of claim 53, at least one of said second and third deflectors comprised of a fixed reflective surface.

58. The optical switch of claim 53, at least one of said first, second, third, and fourth defectors comprised of a flat reflective surface.

59. The optical switch of claim 53, at least one of said first, second, third, and fourth deflectors comprised of a curved reflective surface.

60. The optical switch of claim 53, at least one of said first, second, third, and fourth deflectors comprised of a spherical curved reflective surface.

61. The optical switch of claim 53, at least one of said first, second, third, and fourth deflectors comprised of an aspherical reflective surface.

62. The optical switch of claim 53, at least one of said first, second, third, and fourth deflectors comprised of a linear array of reflective surfaces, said linear array comprised of portions of said array, each said portion selectively operable to deflect one of said input signal components.

63. The optical switch of claim 53, at least one of said first, second, third, and fourth deflectors comprised of an area array of reflective surfaces.

64. The optical switch of claim 53, at least one of said first and second inputs comprised of an optical fiber.

65. The optical switch of claim 53, at least one of said first and second outputs comprised of an optical fiber.

66. The optical switch of claim 53, further comprising at least one optical fiber to direct at least one signal component from said signal separator to said first deflector.

67. The optical switch of claim 53, said signal separator further comprising a grating.

68. The optical switch of claim 53, said signal separator further comprising a prism.

69. The optical switch of claim 53, said signal separator further comprising a hologram.

70. The optical switch of claim 53, said signal separator further comprising an arrayed waveguide grating.

71. An optical switch comprising:
 a first input operable to provide a first input optical signal;
 a second input operable to provide a second input optical signal;
 a first output operable to transmit either of said first and second signals;
 a second output operable to transmit said first signal;
 a retro-reflector;
 a first deflector operable to rotate about an axis in opposite directions from a neutral position to a first and second state, said first deflector operable in said first state to direct said first input optical signal from said first input to a first point on said retro-reflector, said first deflector operable in said second state to direct said first input optical signal to a second point on said retro-reflector;

a second deflector operable to direct said first input optical signal from said second point of said retro-reflector to said second output;

a third deflector operable to direct said second input optical signal from said second input to a third point on said retro-reflector, at least one of said second and third deflectors comprised of a fixed reflective surface; and a fourth deflector operable to rotate about an axis in opposite directions from a neutral position to a first and second state, said fourth deflector operable in said first state to direct said first optical input signal from said first point on said retro-reflector to said first output, said fourth deflector operable in said second state to direct said second input optical signal from said third point on said retro-reflector to said first output.

72. The optical switch of claim 71, wherein said retro-reflector is comprised of at least two separate retro-reflectors.

73. The optical switch of claim 71, wherein said retro-reflector is operable to focus at least one of said first and second signals.

74. The optical switch of claim 71, at least one of said first, second, third, and fourth deflectors comprised of a single reflective surface.

75. The optical switch of claim 71, at least one of said first, second, third, and fourth deflectors comprised of an array of reflective surfaces.

76. The optical switch of claim 71, said first, second, third, and fourth deflectors comprised of a single array of reflective surfaces.

77. An optical switch comprising:

a first input operable to provide a first input optical signal;

a second input operable to provide a second input optical signal;

a first output operable to transmit either of said first and second signals;

a second output operable to transmit said first signal;

a retro-reflector;

a signal separator operable to receive said first input optical signal and to separate said first input optical signal into at least two first input signal components;

a first deflector operable to rotate about an axis in opposite directions from a neutral position to a first and second state, said first deflector operable in said first state to direct at least one said first input signal component from said first input to a first region of said retro-reflector, said first deflector operable in said second state to direct at least one said first input signal component from said first input to a second region of said retro-reflector;

a second deflector operable to direct said at least one said first input signal component from said second region of said retro-reflector to said second output;

a third deflector operable to direct at least one component of said second input optical signal from said second input to a third region of said retro-reflector, at least one of said second and third deflectors comprised of a fixed reflective surface; and a fourth deflector operable to rotate about an axis in opposite directions from a neutral position to a first and second state, said fourth deflector operable in said first state to direct said at least one said first input signal component from said first region of said retro-reflector to said first output, said fourth deflector operable in said second state to direct said second input optical signal from said third region of said retro-reflector to said first output.

78. The optical switch of claim 77, wherein said retro-reflector is comprised of at least two separate retro-reflectors.

79. The optical switch of claim 77, wherein said retro-reflector is operable to focus at least one of said first and second signals.

80. The optical switch of claim 77, at least one of said first, second, third, and fourth deflectors comprised of a single reflective surface.

81. The optical switch of claim 77, at least one of said first, second, third, and fourth deflectors comprised of an array of reflective surfaces.

82. The optical switch of claim 77, said first, second, third, and fourth defectors comprised of a single array of reflective surfaces.

83. An optical switch comprising:

a first input operable to provide a first input optical signal;

a second input operable to provide a second input optical signal;

a first output operable to transmit either of said first and second signals;

a second output operable to transmit said first signal;

a first deflector;

a second deflector;

a third deflector;

a fourth deflector;

said first deflector operable to rotate about an axis in opposite directions from a neutral position to a first and second state, said first deflector operable in said first state to direct said first input optical signal from said first input to said fourth deflector, said first deflector operable in said second state to direct said first input optical signal to said second deflector;

said second deflector operable to direct said first input optical signal from said first deflector to said second output;

said third deflector operable to direct said second input optical signal from said second input to said fourth deflector, at least one of said second and third deflectors comprised of a fixed reflective surface; and said fourth deflector operable to rotate about an axis in opposite directions from a neutral position to a fist and second state, said fourth deflector operable in said first state to direct said first optical input signal from said first deflector to said first output, said fourth deflector operable in said second state to direct said second input optical signal from said third deflector to said first output.

84. The optical switch of claim 83, at least one of said first, second, third, and fourth deflectors comprised of a single reflective surface.

85. The optical switch of claim 83, at least one of said first, second, third, and fourth defectors comprised of an array of reflective surfaces.

86. The optical switch of claim 83, said first, second, third, and fourth deflectors comprised of a single array of reflective surfaces.

87. An optical switch comprising:

a first input operable to provide a first input optical signal;

a second input operable to provide a second input optical signal;

a first output operable to transmit either of said first and second signals;

a second output operable to transmit said first signal;

a signal separator operable to receive said first input optical signal and to separate said first input optical signal into at least two first input signal components;

a first deflector;

a second deflector;

a third deflector;

a fourth deflector;

said first deflector operable to rotate about an axis in opposite directions from a neutral position to a first and second state, said first deflector operable in said first state to direct at least one said first input signal component from said first input to said second deflector, said first deflector operable in said second state to direct at least one said first input signal component from said first input to said fourth deflector;

said second deflector operable to direct said at least one said first input signal component from first deflector to said second output;

said third deflector operable to direct at least one component of said second input optical signal from said second input to said fourth deflector, at least one of said second and third deflectors comprised of a fixed reflective surface; and said fourth deflector operable to rotate about an axis in opposite directions from a neutral position to a first and second state, said fourth deflector operable in said first state to direct said at least one said first input signal component from said first deflector to said first output, said fourth deflector operable in said second state to direct said second input optical signal from said third deflector to said first output.

88. The optical switch of claim 87, at least one of said first, second, third, and fourth deflectors comprised of a single reflective surface.

89. The optical switch of claim 87, at least one of said first, second, third, and fourth deflectors comprised of an array of reflective surfaces.

90. The optical switch of claim 87, said first, second, third, and fourth deflectors comprised of a single array of reflective surfaces.

* * * * *